UNITED STATES PATENT OFFICE.

KARL ARVID JOHANSSON, OF SANDVIKEN, SWEDEN.

METHOD OF DESULFURIZING ORES.

No. 899,219.　　　Specification of Letters Patent.　　　Patented Sept. 22, 1908.

Application filed October 17, 1907. Serial No. 397,948.

*To all whom it may concern:*

Be it known that I, KARL ARVID JOHANSSON, a subject of the King of Sweden, and resident of Sandviken, in the Kingdom of Sweden, have invented certain new and useful Improvements in Methods of Desulfurizing Ores, of which the following is a specification.

Some iron or manganese ores can not, because of their composition, be desulfurized according to the hitherto known methods for this purpose. In the process of enrichment, either in the magnetical or in the wet way, the yield of sulfur in the pulverous ore may become high, and though the ore is in a pulverous condition the sulfur can not be removed by the roasting operation. In both cases the difficulty generally consists in that the ore contains carbonate of lime which during the roasting binds the sulfurous acid formed by the oxidation of the sulfur so as to produce sulfate of lime which can not be decomposed at the temperature suitable for good roasting. The only acid which at higher temperatures can remove the sulfurous acid from the gypsum is the silicic acid which liberates the sulfurous acid with the formation of silicate of lime. However, if there be no carbonate of lime present in the ore, basic sulfates of iron are formed during the roasting which upon the raising of the temperature successively give off sulfurous acid till about 1400 centigrades is reached when only oxid-protoxid of iron ($FeO, Fe_2O_3$) is left.

The present invention has for its object a process consisting in mixing such ores as either contain carbonate of lime or in which ores the sulfur is present in such a form that it can not be removed by raising the temperature within suitable limits, with a mineral or an ore or other matter in a pulverous state and containing free silicic acid, and thereafter burning the mixture at about sintering heat, whereby the silicic acid removes the sulfur. The mixing may be executed during or after the pulverization of the ore, and the mixture may suitably be pressed to the form of briquets. The burning of the mixture that is of the briquets may be performed in a rotating furnace or another furnace of suitable construction.

Having now described my invention, what I claim as new and desire to secure by Letters Patent is:

1. The herein described method of desulfurizing iron or manganese ores, consisting in mixing the said ores with a matter containing free silicic acid, pressing the mixtures to the form of briquets and burning the said briquets, substantially as and for the purpose set forth.

2. The herein described method of desulfurizing iron or manganese ores, consisting in mixing the said ores with a mineral containing free silicic acid, pressing the mixture to the form of briquets and burning the said briquets, substantially as and for the purpose set forth.

In witness whereof, I have hereunto signed my name in the presence of two subscribing witnesses.

KARL ARVID JOHANSSON.

Witnesses:
　CARL TRIBEY,
　HJALMAR ZETURSTROM.